(12) United States Patent
Nowak et al.

(10) Patent No.: US 9,407,568 B2
(45) Date of Patent: Aug. 2, 2016

(54) SELF-CONFIGURING DYNAMIC CONTACT CENTER

(71) Applicant: Avaya Inc., Basking Ridge, NJ (US)

(72) Inventors: Dawid Nowak, Dublin (IE); Joseph Smyth, Galway (IE)

(73) Assignee: Avaya, Inc., Basking Ridge, NJ (US)

( * ) Notice: Subject to any disclaimer, the term of this patent is extended or adjusted under 35 U.S.C. 154(b) by 0 days.

(21) Appl. No.: 14/082,880

(22) Filed: Nov. 18, 2013

(65) Prior Publication Data

US 2015/0142933 A1    May 21, 2015

(51) Int. Cl.
*G06F 15/173* (2006.01)
*H04L 12/911* (2013.01)
*H04L 12/26* (2006.01)

(52) U.S. Cl.
CPC ............ *H04L 47/70* (2013.01); *H04L 43/0882* (2013.01); *H04M 2203/40* (2013.01)

(58) Field of Classification Search
CPC .......... H04L 41/04; H04L 41/24; H04L 41/50
USPC ......... 709/203, 219, 224, 226, 238, 244, 220, 709/227, 201, 229, 235, 239
See application file for complete search history.

(56) References Cited

U.S. PATENT DOCUMENTS

| | | | | |
|---|---|---|---|---|
| 5,515,509 A * | 5/1996 | Rom | ...................... | H04L 29/06 709/228 |
| 5,684,956 A * | 11/1997 | Billings | .............. | G06F 13/4226 709/203 |
| 6,289,389 B1 * | 9/2001 | Kikinis | ................. | H04L 69/169 709/235 |
| 6,438,595 B1 * | 8/2002 | Blumenau et al. | ............ | 709/226 |
| 6,658,478 B1 * | 12/2003 | Singhal | ................... | H04L 67/42 709/232 |
| 6,766,359 B1 * | 7/2004 | Oliveira | ............... | G06F 11/201 709/213 |
| 7,023,793 B2 * | 4/2006 | Khambatkone | ........... | H04J 3/14 370/218 |
| 7,130,928 B2 * | 10/2006 | Hayashi et al. | ................... | 710/8 |
| 7,243,160 B2 * | 7/2007 | Brahmaroutu | .......... | H04L 45/02 370/237 |
| 7,519,046 B2 * | 4/2009 | Suzuki et al. | ................. | 370/351 |
| 7,554,910 B2 * | 6/2009 | Iwata et al. | ................... | 370/231 |
| 7,831,781 B2 * | 11/2010 | Usami | .......................... | 711/154 |
| 8,953,438 B2 * | 2/2015 | Birkedahl | ........... | H04L 12/4641 370/219 |
| 2003/0023701 A1 * | 1/2003 | Norman et al. | ............... | 709/214 |
| 2003/0105802 A1 * | 6/2003 | Kurashima et al. | ........... | 709/203 |
| 2008/0052393 A1 * | 2/2008 | McNaughton et al. | ....... | 709/224 |
| 2009/0138577 A1 * | 5/2009 | Casado | ................... | H04L 41/06 709/220 |
| 2010/0257281 A1 * | 10/2010 | Patel | ..................... | G06F 15/173 709/239 |
| 2014/0098674 A1 * | 4/2014 | Sonoda et al. | ................ | 370/238 |
| 2014/0122560 A1 * | 5/2014 | Ramey | .............. | G06F 15/17312 709/201 |

* cited by examiner

*Primary Examiner* — Michael Y Won (57) ABSTRACT

A self-configuring dynamic contact center including a plurality of resources, each resource associated with a set of attributes, a plurality of dynamic switches connected to the resources, a dynamic controller connected to the dynamic switches and configured to control the operation of the dynamic switches, and a routing engine connected to the dynamic controller. The routing engine is configured to utilize the dynamic controller and dynamic switches to determine the states of network paths between the dynamic switches, and is further configured to determine which of the resources are suitable to handle a contact based on requirements of the contact and the attributes of the resources, to determine which of the suitable resources is an optimal resource based on the requirements of the contact and the states of the network paths, and to utilize the dynamic controller and the dynamic switches to route the contact to the optimal resource.

14 Claims, 4 Drawing Sheets

SELF-CONFIGURING DYNAMIC CONTACT CENTER

BACKGROUND

1. Field of the Invention

Embodiments of the present invention provide a system and a method for managing a contact center. More particularly, embodiments of the present invention provide a system and a method for enabling a contact center to dynamically modify its routing configuration in response to variations in contacts and resources.

2. Description of Related Art

Contact centers are employed by many enterprises to service inbound and outbound communication with contacts/customers. A typical contact center includes a number of switches and routers for receiving and routing incoming packet-switched and/or circuit-switched contacts, and one or more resources, such as human agents and automated resources (e.g., Interactive Voice Response (IVR) units), to service the incoming contacts.

Contact centers distribute contacts, whether inbound or outbound, for servicing to any suitable resource according to predefined criteria. In many existing systems, the criteria for servicing a contact from the moment the contact center becomes aware of the contact until the contact is connected to an agent are client or operator-specifiable (i.e., programmable by the operator of the contact center), via a capability called vectoring. Normally, in present-day automatic call distribution (ACD), when an ACD system's controller detects an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is where there are no contacts waiting to be handled.

The switches and routers that are employed in traditional contact center infrastructure and, more generally, in traditional computer/telecommunications infrastructure, are typically very large, very expensive, and are difficult to reconfigure once a particular network configuration has been established. Thus, while the use of such infrastructure may facilitate a reliable system, it also presents a number of drawbacks. For example, route configurations within the system do not change when resources (e.g., agents, automated media, etc.) are added or removed, resulting in inefficient network utilization. Furthermore, route configurations within the system do not change when networks become congested, because networks have no flexibility to adapt or reconfigure in response to changing traffic patterns. Still further, since switches are responsible for data forwarding and network control, their failure may have a detrimental effect on many other network components.

SUMMARY

In view of the foregoing, it would be advantageous to provide a system and method for enabling a contact center to dynamically modify its routing configuration in response to variations in contact requirements, contact center resources, and traffic patterns in order to optimize routing efficiency and reduce operating costs.

Embodiments in accordance with the present invention provide a self-configuring dynamic contact center. The contact center includes a plurality of resources, each resource associated with a set of attributes. The contact center further includes a plurality of dynamic switches connected to the resources, a dynamic controller connected to the dynamic switches and configured to control the operation of the dynamic switches, and a routing engine connected to the dynamic controller. The routing engine is configured to utilize the dynamic controller and the dynamic switches to determine the states of network paths between the dynamic switches, and is further configured to determine which of the resources are suitable to handle a contact based on requirements of the contact and the attributes of the resources. The routing engine may further be configured to determine which of the suitable resources is an optimal resource based on the requirements of the contact and the states of the network paths, and to utilize the dynamic controller and the dynamic switches to route the contact to the optimal resource, or, the routing engine may be configured to determine which of a plurality of routes between the contact and a suitable resource is an optimal route based on the requirements of the contact and the states of the network paths, and to utilize the dynamic controller and the dynamic switches to route the contact to the suitable resource via the optimal route.

Embodiments in accordance with the present invention further provide a computer-implemented method for establishing a self-configuring dynamic contact center. The computer-implemented method includes receiving a contact at a dynamic switch network comprising a plurality of dynamic switches interconnected by network paths, identifying a plurality of resources within the contact center that are suitable for handling the contact, determining the states of the network paths, designating one of the suitable resources as an optimal resource based on the states of the network paths, and routing the contact to the optimal resource.

Embodiments in accordance with the present invention further provide a computer-implemented method for establishing a self-configuring dynamic contact center. This computer-implemented method includes receiving a contact at a dynamic switch network comprising a plurality of dynamic switches interconnected by network paths, identifying a resource within the contact center that is suitable for handling the contact, determining the states of the network paths, determining which of a plurality of routes between the contact and the suitable resource is an optimal route, and routing the contact to the suitable resource via the optimal route.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible, utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an ACD or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The terms "component" and "module" as used herein refer to any known or later developed hardware, software, firmware, artificial intelligence, fuzzy logic, or combination of hardware and software that is capable of performing the functionality associated with the referenced element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 1:
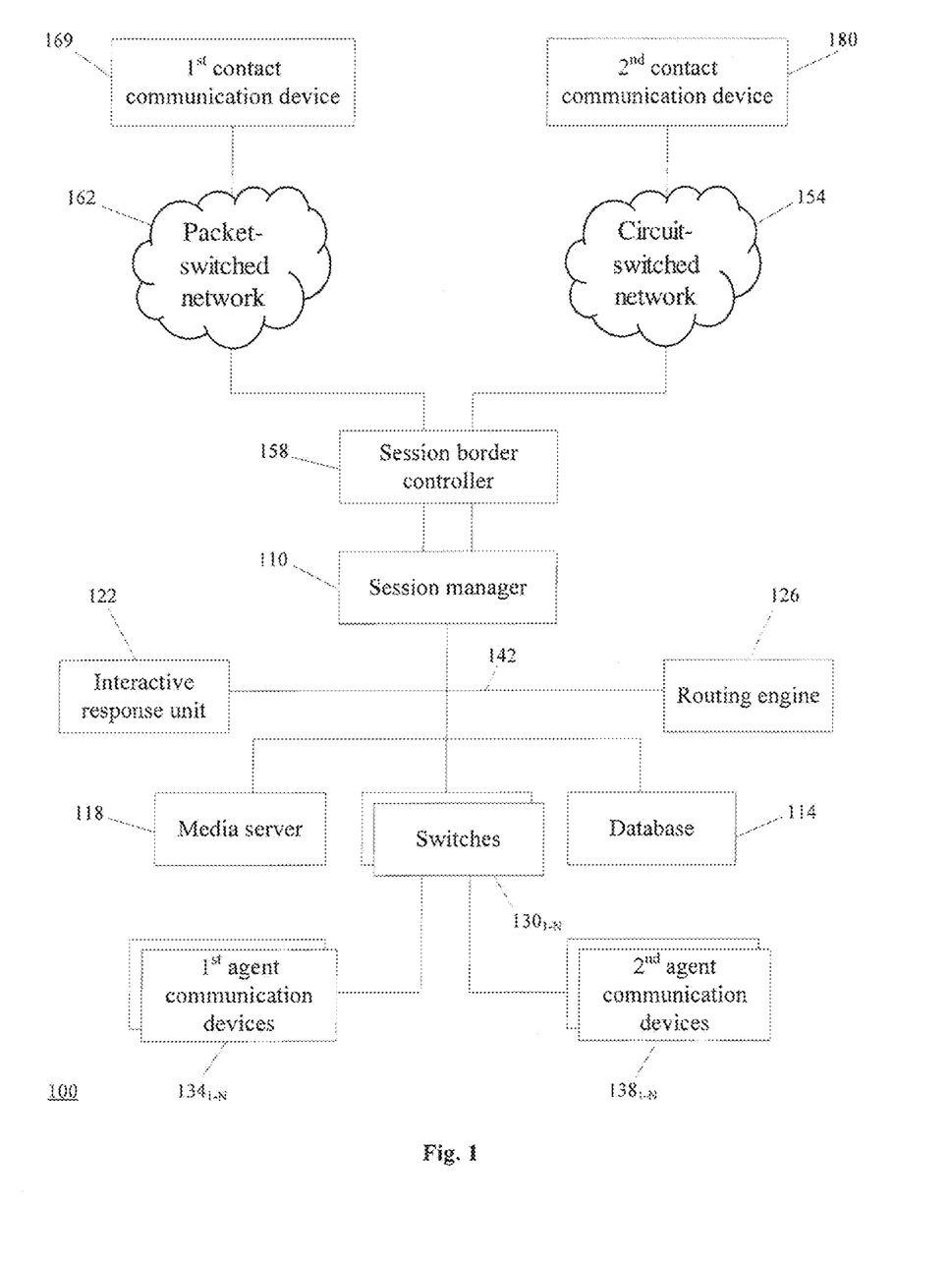
FIG. 1 is a schematic diagram illustrating an exemplary self-configuring dynamic contact center in accordance with an embodiment of the present invention.

FIG. 1 shows an illustrative embodiment of a self-configuring dynamic contact center 100 (hereinafter "the contact center 100") in accordance with the present invention. The contact center 100 may include a session manager 110, a set of data stores or databases 114 containing contact or customer related information and other information that can enhance the value and efficiency of contact processing, and a plurality of servers, namely a media server 118, an interactive response unit (e.g., IVR) 122, a routing engine 126, and switches $130_{1-N}$, all interconnected by a local area network LAN (or wide area network WAN) 142 or other network connection technologies. A plurality of working agents operating packet-switched $1^{st}$ agent communication devices $134_{1-N}$ (such as computer work stations or personal computers), and/or circuit-switched $2^{nd}$ agent communication devices $138_{1-N}$ may be connected to respective switches $130_{1-N}$. The session manager 110 is further connected to a circuit switched network 154 (e.g., a Public Switch Telephone Network or PSTN) and a packet switched network 162 (e.g., a distributed processing network, such as the Internet). The packet-switched network 162 is in communication with one or more external $1^{st}$ contact communication devices 169, and the circuit-switched network 154 with one or more external $2^{nd}$ contact communication devices 180, used by customers to communicate with the contact center 100. A session border controller 158 is positioned between the session manager 110 and the networks 154 and 162 for processing communications passing between the session manager 110 and the networks 154 and 162 as further described below.

Although the preferred embodiment is discussed with reference to client-server architecture, it is to be understood that the principles of the present invention apply to other network architectures. For example, the present invention applies to peer-to-peer networks, such as those envisioned by the Session Initiation Protocol. In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program.

Additionally, the present invention does not require the presence of packet-or circuit-switched networks. The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

In one embodiment, the session border controller 158 of the contact center 100 may be Avaya Inc.'s, G700 Media Gateway.™, which may be implemented as a hardware component, such as via an adjunct processor or as a chip onboard the server. The session border controller 158 is responsible for providing the contact center 100 with a security gateway for protecting the contact center 100 from malicious attacks, toll fraud, malformed packets, and the like. It will be appreciated by those of ordinary skill in the art that the session border controller 158 may perform a variety of other functions, such as facilitating network connectivity, monitoring quality of service, and providing regulatory support.

The session manager 110 is responsible for routing and managing contacts inside of the contact center 100 (i.e., after the contacts have been admitted to the contact center 100 by the session border controller 158). Particularly, the session manager 110 communicates with the other SIP enabled devices (e.g., the media server 118, IVR 122, routing engine 126, and switches $130_{1-N}$) in the contact center 100 and is configured with routing and dial plans to facilitate appropriate forwarding of incoming contacts as designated by the routing engine 126 as further described below.

The routing engine 126 is responsible for determining where, within the contact center 100, incoming contacts should be routed to and notifying the session manager 110 accordingly. For example, the routing engine 126 may receive a notification from the session manager 110 indicating that an incoming contact has been received. The routing engine 126 may then scan an internal database for available resources (e.g., agents, the media server 118, etc.) within the contact center 100 which are best suited to handle that particular contact. The routing engine 126 may access customer/contact information stored in the database(s) 114 in order to make such a determination. The routing engine 126 may then transmit a response back to the session manager 110 indicating the specific resource to which the contact should be routed. For example, the routing engine 126 may indicate to the session manager 110 that, based on the language requirements of a particular contact, that contact should be routed to an appropriate agent at a particular one of the $1^{st}$ agent communication devices $134_{1-N}$ via a respective one of the switches $130_{1-N}$.

The IVR 122 provides an interactive, automated menu system for allowing incoming contacts to at least partially navigate to an appropriate resource within the contact center 100. For example, an incoming contact may be connected to the IVR 122, may select options to navigate through an automated menu, and may thereby be connected to an appropriate/desired resource without tying up contact center personnel. The IVR 122 may also perform other functions that will be familiar to those of ordinary skill in the art, such as allowing a contact to select a preferred language of communication, based on which the IVR system may intelligently route the contact to an agent who is fluent in the selected language.

The media server 118 of the contact center 100 is responsible for playing treatment messages for contacts when appropriate. Such treatment messages may include prerecorded announcements (e.g., "an agent will be with you shortly"), on-hold music, etc. The particular format of the treatment message may depend on the type of contact received. For example, video chat contacts may receive video messages, while phone call contacts may receive voice messages.

The first agent communication devices $134_{1-N}$ are packet-switched devices that may include, for example, IP hardphones such as the Avaya Inc.'s, 4600 Series IP Phones.™., IP softphones such as Avaya Inc.'s, IP Softphone.™, Personal Digital Assistants or PDAs, Personal Computers or PCs, laptops, packet-based H.320 video phones and conferencing units, packet-based voice messaging and response units, packet-based traditional computer telephony adjuncts, peer-to-peer based communication devices, and any other communication device.

The second agent communication devices $138_{1-N}$ are circuit-switched devices. Each of the second agent communication devices $138_{1-N}$ corresponds to one of a set of internal extensions $Ext_{1-N}$, respectively. The second agent communication devices $138_{1-N}$ can include, for example, wired and wireless telephones, PDAs, H.320 videophones and conferencing units, voice messaging and response units, traditional computer telephony adjuncts, and any other communication device.

It should be noted that the present invention does not require any particular type of information transport medium between switch or server and first and second communication devices, i.e., the present invention may be implemented with any desired type of transport medium as well as combinations of different types of transport channels.

It should be emphasized that the particular configuration of the contact center 100 shown in FIG. 1, including all of the components thereof, is presented for purposes of illustration only and should not be construed as limiting the present invention to any particular arrangement of elements.

Figure 2:
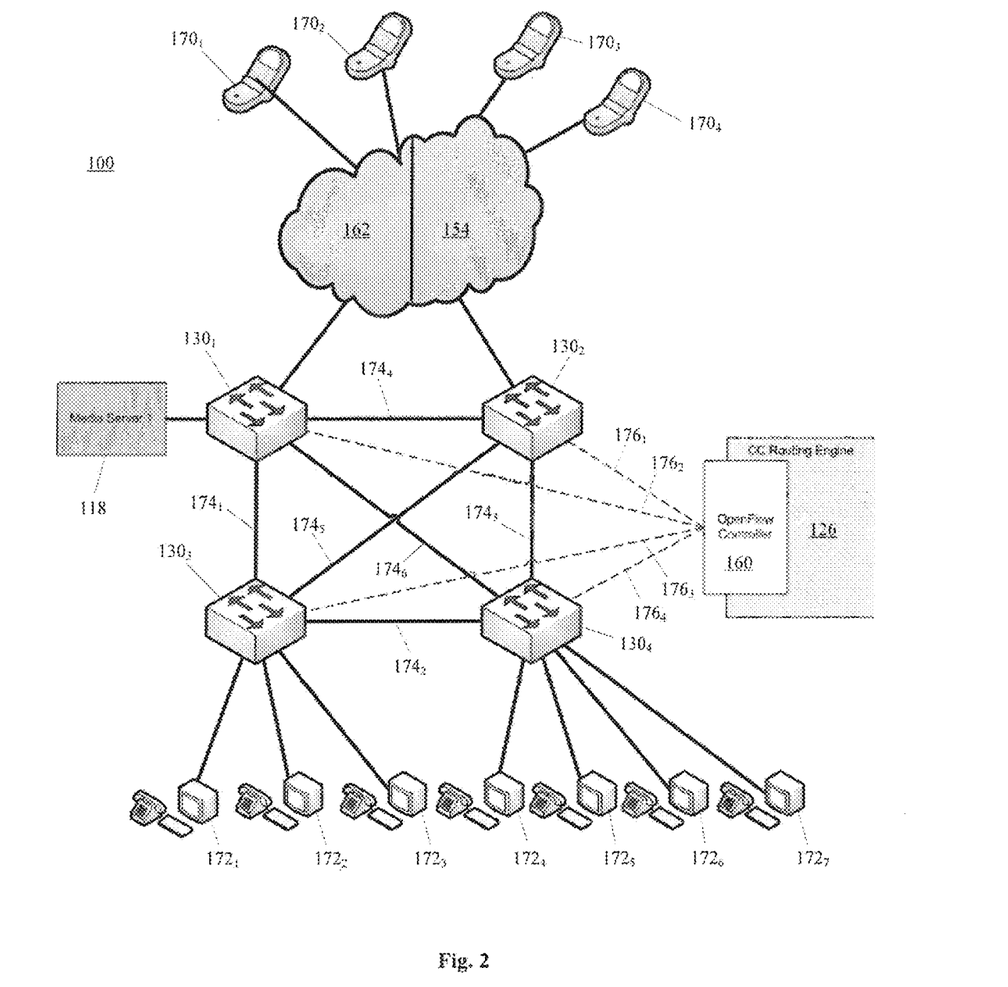
FIG. 2 is a schematic diagram detailing certain features of the exemplary self-configuring dynamic contact center shown in FIG. 1.

Referring to FIG. 2, a simplified schematic representation of the contact center 100 is illustrated (in which certain components of the contact center 100 shown in FIG. 1 are omitted for clarity) for presenting certain aspects of the contact center 100 in greater detail. Particularly, the switches $130_{1-4}$ of the contact center 100 are OpenFlow enabled switches that are operatively connected to an OpenFlow controller 160 (described in greater detail below) that receives instructions from, and may be implemented as an integral component of, the routing engine 126 of the call center 100.

As will be recognized by those of ordinary skill in the art, OpenFlow is an open communications protocol that may be added to commercial Ethernet switches, routers and wireless access points to enable certain routing control features not found in conventional routers or switches. For example, in a conventional router or switch, fast packet forwarding (data path) and high level routing decisions (control path) occur on the same device. By contrast, OpenFlow enabled switches, such as the switches $130_{1-4}$, separate data path and control path functions. Particularly, the data path portions reside on the switches $130_{1-4}$ while high-level routing decisions reside a separate controller, such as the OpenFlow enabled controller 160. The OpenFlow enabled switches $130_{1-4}$ and controller 160 communicate via OpenFlow protocol, which defines messages, such as packet-received, send-packet-out, modify-forwarding-table, and get-stats The implementation and operation of the various OpenFlow components in the contact center 100 will be described in greater detail below.

It should be noted that the switches $130_{1-4}$ and controller 160 may alternatively or additionally be enabled with any other software packages or systems (i.e., other than OpenFlow) that facilitate similar, dynamically controllable routing. Therefore, the switches $130_{1-4}$ and controller 160 will hereinafter be referred to as the "dynamic switches $130_{1-4}$" and the "dynamic controller 160," such terminology defined herein to encompass OpenFlow enabled switches and controllers as well as switches and controllers enabled with other, similar technologies that are known in the art or that have yet to be developed.

Still referring to FIG. 2, a plurality of contacts $170_{1-4}$ are connected to the packet-switched network 162 and/or the circuit-switched network 154, such as via the $1^{st}$ and $2^{nd}$ contact communication devices 169 and 180 shown in FIG. 1. The packet-switched network 162 and the circuit-switched network 154 are connected to the dynamic switches $130_{1-4}$, such as via the session border controller 158 and the session manager 110 shown in FIG. 1. The dynamic switches $130_{1-4}$ route contact traffic to and from a plurality of agents $172_{1-7}$ who are equipped with the $1^{st}$ and/or $2^{nd}$ agent communication devices $134_{1-N}$ and $138_{1-N}$ shown in FIG. 1.

The dynamic switches $130_{1-4}$ are interconnected by network paths $174_{1-6}$, and are connected to the dynamic controller 160 by control channels $176_{1-4}$. The dynamic controller 160 may thereby transmit instructions to the dynamic switches $130_{1-4}$ that dictate the manner in which contact traffic is routed between the dynamic switches $130_{1-4}$ and to the agents $172_{1-7}$ in accordance with routing decisions made by the routing engine 126. In order to make such routing decisions, the routing engine 126 monitors the attributes/skill sets of all of the active agents $172_{1-7}$ (or other resources) in the contact center 100. For example, the routing engine 126 may determine which agents $172_{1-7}$ have video call capability, what languages each of the agents $172_{1-7}$ speaks, what the agents' respective areas of expertise are, etc. Additionally, by virtue of the communication between the dynamic controller 160 the dynamic switches $130_{1-4}$, the dynamic controller 160 enables the routing engine 126 to continuously monitor the states of the network paths $174_{1-6}$ between the dynamic switches $130_{1-4}$. Thus, by correlating the requirements of each contact $170_{1-4}$ (e.g., language requirements, communication device requirements, bandwidth requirements, etc.) with the attributes of available resources and the current traffic levels between the dynamic switches $130_{1-4}$, the routing engine 126 may determine the best manner in which to route contact traffic in order to most efficiently utilize contact center resources and optimize customer/contact experience.

The routing engine 126 may use the dynamic controller 160 and the dynamic switches $130_{1-4}$ to implement the above-described intelligent routing scheme in either a "passive" manner, wherein contact center resources are allocated based on the monitored state of the switch network, or an "active" manner, wherein the switch network is monitored and actively modified in order to direct traffic to contact center resources in an optimal manner.

In an illustrative, non-limiting example of a passive implementation of the contact center 100, the contact $170_1$ in FIG. 2 is a high priority customer who places a video call to the contact center 100 which arrives at the dynamic switch $130_1$. The contact $170_1$ may then be presented with a treatment message by the media server 118 while the routing engine 126 identifies agents $172_{1-7}$ having attributes best suited to handle the call. In this example, the agents $172_1$ and $172_4$ both have skill sets that are suitable for the contact $170_1$, are both equipped to handle video calls, and are both currently available, and are therefore both eligible for selection by the routing engine 126. However, the network path $174_1$ between the dynamic switch $130_1$ and the dynamic switch $130_3$ is currently heavily utilized and has limited available bandwidth for handling a video call without compromising call quality (i.e., audio and/or video quality).

In conventional contact centers, the state of the network paths $174_{1-6}$ would not be taken into account when selecting an agent $172_{1-7}$ to handle the contact, which could result in a suboptimal agent selection (e.g., agent $172_1$ is less preferable in this example because the network path $174_1$ leading to agent $172_1$ is congested and is not suitable for supporting a video call). However, in the dynamic contact center 100 of the present disclosure, the dynamic controller 160 and the dynamic switches $130_{1-4}$ enable the routing engine 126 to monitor the state of the network paths $174_{1-6}$ as described above, and to therefore make an informed routing decision in view of current system loads.

In the present example, the routing engine 126 would utilize the dynamic controller 160 and the dynamic switches $130_{1-4}$ to route the contact $170_1$ to the agent $172_4$ (i.e., via the less congested network path $174_5$ between dynamic switch $130_1$ and dynamic switch $130_4$) instead of to the agent $172_1$, thereby providing the contact $170_1$ with a higher quality video call and a better customer experience. The agent $172_4$ in this scenario may therefore be termed the "optimal resource," selected from a plurality of suitable resources. However, if the contact $170_1$ was a low priority contact and/or did not require a great deal of bandwidth for a suitable connection (e.g., if the contact $170_1$ was a voice call), the routing engine 126 might utilize the dynamic controller 160 and the dynamic switches $130_{1-4}$ to route the contact $170_1$ to the agent $172_1$, thereby leaving the agent $172_4$ available for contacts who have higher priority and/or require greater bandwidth connections. The "optimal resource" in such a scenario would therefore be the agent $172_1$.

In an illustrative, non-limiting example of the active implementation of the contact center 100, the contact $170_1$ in FIG. 2 is again a high priority customer who places a video call to the contact center 100 which arrives at the dynamic switch $130_1$. As in the passive implementation example above, the contact $170_1$ may then be played a treatment message by the media server 118 while the routing engine 126 identifies an agent $172_{1-7}$ who is best suited to handle the call. In this example, only the agent $172_1$ is available and has the skill set and equipment necessary for handling the requirements of contact $170_1$. However, as in the example above, the network path $174_1$ between the dynamic switch $130_1$ and the dynamic switch $130_3$ is currently heavily utilized and has limited available bandwidth for handling a video call without compromising call quality.

In conventional contact centers, the contact $170_1$ might be routed to the agent $172_1$ via the network path $174_1$, despite the heavy congestion thereof, due to a static, preconfigured routing scheme. However, in the dynamic contact center 100 of the present disclosure, the dynamic controller 160 and the dynamic switches $130_{1-4}$ enable the routing engine 126 to dynamically modify the route between a contact and a specific resource in view of system loads. In the present example, the routing engine 126 would utilize the dynamic controller 160 and the dynamic switches $130_{1-4}$ to route the contact $170_1$ to agent $172_1$ via the less congested network paths $174_5$ and $174_2$ (or network paths $174_4$ and $174_5$) instead of the highly congested network path $174_1$, thereby providing the contact $170_1$ with a higher quality call and a better customer experience. The network paths $174_5$ and $174_2$ in this scenario may therefore be termed the "optimal route," selected from a plurality of suitable routes.

However, if the contact $170_1$ was a low priority contact and/or did not require a great deal of bandwidth for a suitable connection, the routing engine 126 might utilize the dynamic controller 160 and the dynamic switches $130_{1-4}$ to route the contact $170_1$ to the agent $172_1$ via the network path $174_1$, thereby leaving the less congested network paths $174_5$ and $174_2$ available for contacts who have higher priority and/or require greater bandwidth connections. The "optimal route" in such a scenario would therefore be the network path $174_1$.

Figure 3:
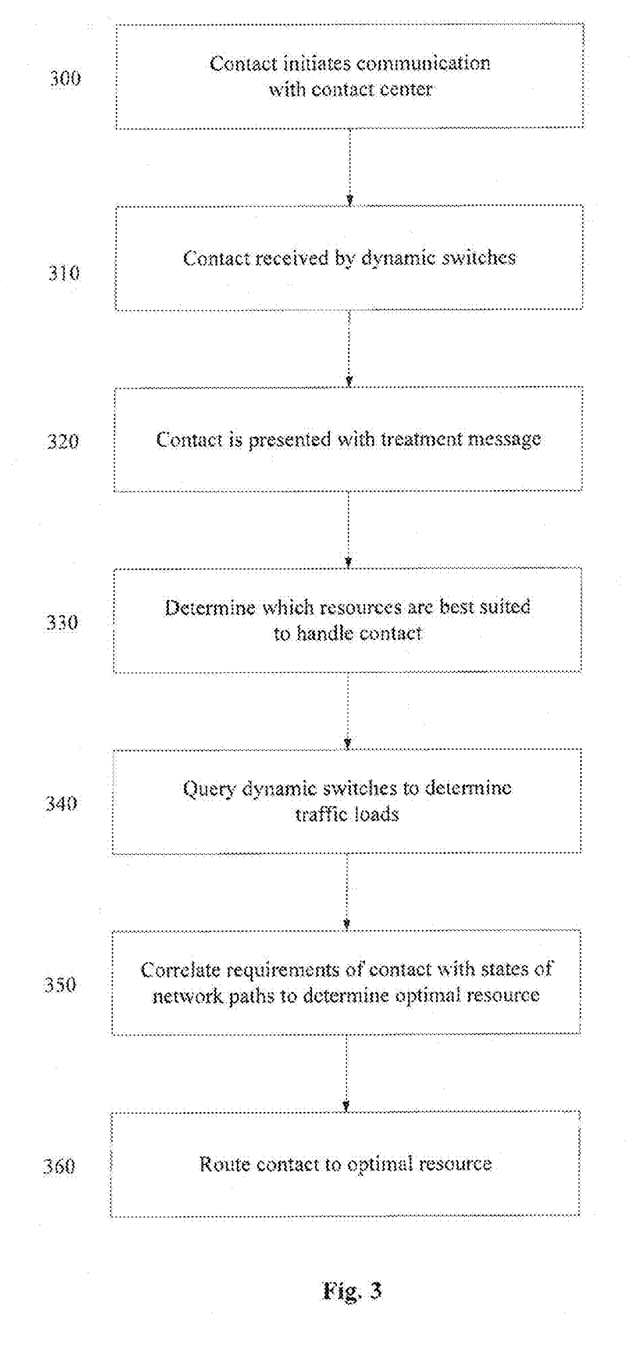
FIG. 3 is flow diagram illustrating an exemplary method of implementing the self-configuring dynamic contact center in accordance with an embodiment of the present invention.

Referring to FIG. 3, a flow diagram illustrating an exemplary method for implementing the above-described passive routing scheme of the self-configuring dynamic contact center 100 in accordance with the present disclosure is shown. Such method will now be described in conjunction with the schematic representation of the contact center 100 shown in FIG. 2.

At a first step 300 of the exemplary method, a contact $170_{1-4}$ may initiate communication with the contact center 100, such as via the $1^{st}$ and $2^{nd}$ contact communication devices 169 and 180 shown in FIG. 1. The contact $170_{1-4}$ may then, at step 310, be received at one of the dynamic switches $130_{1-2}$. At optional step 320, a treatment message provided by the media server 118 may be presented to the contact $170_{1-4}$.

At step 330 of the exemplary method, the routing engine 126 may determine which of the active agents $172_{1-7}$ are best suited to handle the contact $170_{1-4}$ based on the attributes, skill sets, and availability of the agents $172_{1-7}$. The routing engine 126 may then, at step 340, use the dynamic controller 160 to query the dynamic switches $130_{1-4}$ to determine the traffic loads (e.g., queues) on the network paths $174_{1-6}$.

At step 350 of the exemplary method, the routing engine may correlate the requirements of the contact $170_{1-4}$ (e.g., language requirements, communication device requirements, bandwidth requirements, etc.) the traffic loads on the network paths $174_{1-6}$ in order to determine which of the suitable agents $172_{1-7}$ is an optimal resource that the contact $170_{1-4}$ should be routed to in order to most efficiently utilize the network paths $174_{1-5}$ while providing the contact $170_{1-4}$ with a high quality experience.

For example, if the contact $170_{1-4}$ is a video call that requires high bandwidth for a robust, high quality connection, the routing engine 126 may determine that the contact $170_{1-4}$ should be routed to a suitable agent $172_{1-7}$ that is accessible via a route that has a low level of traffic and high available bandwidth. Conversely, if the contact $170_{1-4}$ is a voice call that does not require a great deal of bandwidth, the routing engine 126 may determine that the contact $170_{1-4}$ should be routed to a suitable agent $172_{1-7}$ that is accessible via a more congested route, thereby leaving less congested routes available for contacts requiring high bandwidth connections.

At step 360, the routing engine 126 may utilize the dynamic controller 160 and the dynamic switches $130_{1-4}$ to route the contact $170_{1-4}$ to the optimal resource identified in step 350.

Figure 4:
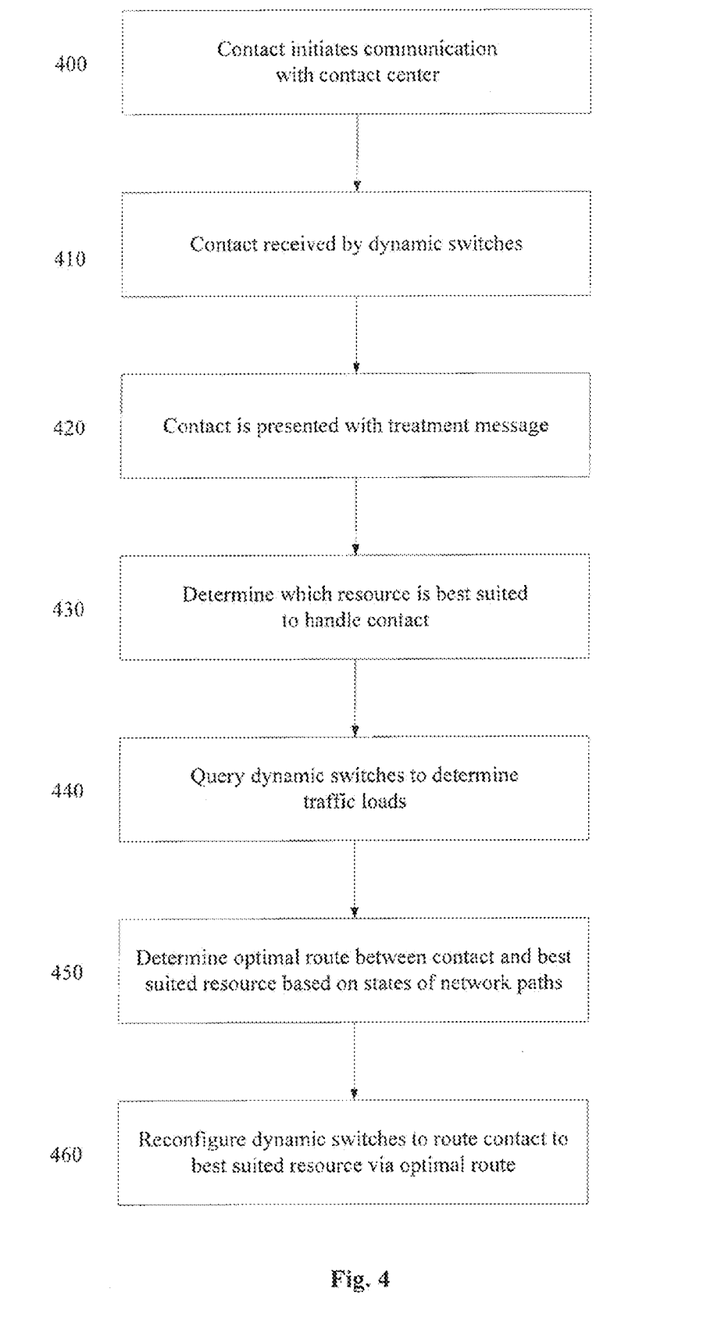
FIG. 4 is flow diagram illustrating another exemplary method of implementing the self-configuring dynamic contact center in accordance with an embodiment of the present invention.

Referring to FIG. 4, a flow diagram illustrating an exemplary method for implementing the above-described active routing scheme of the self-configuring dynamic contact center 100 in accordance with the present disclosure is shown. Such method will now be described in conjunction with the schematic representation of the contact center 100 shown in FIG. 2.

At a first step 400 of the exemplary method, a contact $170_{1-4}$ may initiate communication with the contact center 100, such as via the $1^{st}$ and $2^{nd}$ contact communication devices 169 and 180 shown in FIG. 1. The contact $170_{1-4}$ may then, at step 410, be received at one of the dynamic switches $130_{1-2}$. At optional step 420, a treatment message provided by the media server 118 may be presented to the contact $170_{1-4}$.

At step 430 of the exemplary method, the routing engine 126 may determine which of the active agents $172_{1-7}$ is best suited to handle the contact $170_{1-4}$ based on the attributes, skill sets, and availability of the agents $172_{1-7}$. The routing engine 126 may then, at step 440, use the dynamic controller 160 to query the dynamic switches $130_{1-4}$ to determine the traffic loads (e.g., queues) on the network paths $174_{1-6}$.

At step 450 of the exemplary method, the routing engine 126 may determine, from the traffic loads on the network paths $174_{1-6}$, an optimal route between the contact $170_{1-4}$ and the best suited agent $172_{1-7}$ (identified in step 430) that will efficiently utilize the network paths $174_{1-5}$ while providing the contact $170_{1-4}$ with a high quality experience. For example, if the contact $170_{1-4}$ is a video call that requires high bandwidth for a robust, high quality connection, the routing engine 126 may determine that the contact $170_{1-4}$ should be routed to the best suited agent $172_{1-7}$ via a route that has a low level of traffic and high available bandwidth. Conversely, if the contact $170_{1-4}$ is a voice call that does not require a great deal of bandwidth, the routing engine 126 may determine that the contact $170_{1-4}$ should be routed to the best suited agent $172_{1-7}$ via a more congested route, thereby leaving less congested routes available for contacts requiring high bandwidth connections.

At step 460, the routing engine 126 may utilize the dynamic controller 160 to reconfigure the dynamic switches $130_{1-4}$ to route the contact $170_{1-4}$ to the best suited agent $172_{1-7}$ via the optimal route identified in step 450.

It will be appreciated from the above description that the embodiments of the contact center 100 and corresponding methods provided herein enable dynamic modification of routing configurations in response to contact requirements, variations in contact center resources, and traffic patterns, thereby optimizing contact center routing efficiency and reducing contact center operating costs.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example, in one embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, other software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Also, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include other embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A dynamic contact center comprising:
a plurality of resources, each resource being associated with a respective set of attributes;
a plurality of dynamic switches connected to the resources, wherein the dynamic switches are interconnected by network paths and each dynamic switch comprises a respective data path separate from a respective control path;
a dynamic controller connected to each of the dynamic switches via the respective control path of the dynamic switch to control the operation of the dynamic switches; and
a server in communication with the dynamic controller, the server comprising:
a computer-readable storage medium, storing executable instructions; and
a processor in communication with the computer readable storage medium, the processor when executing the executable instructions:
continuously monitors states of the network paths between the dynamic switches based on information related to the states of the network paths received from the dynamic controller;
determines which of the plurality of resources is suitable to handle the contact based on requirements of the contact and the associated respective sets of attributes of the resources;
determines which of the suitable resources is an optimal resource based on the requirements of the contact and the continuously monitored states of the network paths;
determines a route through the dynamic switches for a dynamic contact center contact to the optimal resource of the dynamic contact center based on the associated respective sets of attributes of the resources and the continuously monitored states of the network paths; and
transmits the determined route to the dynamic controller.

2. The dynamic contact center of claim 1, wherein the processor when executing the executable instructions utilizes the dynamic controller and the dynamic switches to route the contact to the optimal resource.

3. The dynamic contact center of claim 1, wherein the processor when executing the executable instructions determines which of a plurality of routes between the contact and the suitable resource is an optimal route based on the requirements of the contact and the continuously monitored states of the network paths.

4. The dynamic contact center of claim 3, wherein the the processor when executing the executable instructions utilizes the dynamic controller and the dynamic switches to route the contact to the suitable resource via the optimal route.

5. A method of dynamically routing a contact received at a dynamic switch network of a contact center, the dynamic switch network comprising a plurality of dynamic switches interconnected by network paths, the method comprising:

identifying, by a processor, a plurality of resources within the contact center that are suitable for handling the contact, wherein the plurality of dynamic switches are connected to the resources, each resource being associated with a respective set of attributes;
continuously monitoring, by the processor in communication with a dynamic controller, states of the network paths between the dynamic switches,
wherein each dynamic switch comprises a respective data path separate from a respective control path; and
wherein the dynamic controller is connected to each of the dynamic switches via the respective control path of the dynamic switch to control operation of the dynamic switches;
designating, by the processor, one of the suitable resources as an optimal resource based on the continuously monitored states of the network paths and requirements of the contact;
determining, by the processor, routing instructions for routing the contact to the optimal resource via the dynamic switch network based on the associated respective sets of attributes of the resources and the continuously monitored states of the network paths; and
transmitting, by the processor, the routing instructions to the dynamic controller.

6. The method in accordance with claim 5, wherein the step of identifying a plurality of resources within the contact center that are suitable to handle the contact comprises comparing, by the processor, the requirements of the contact with the associated respective sets of attributes of the resources.

7. The method in accordance with claim 5, wherein the step of continuously monitoring the states of the network paths comprises receiving, by the processor, information related to the states of the network paths from the dynamic controller.

8. The method in accordance with claim 5, wherein the step of designating one of the suitable resources as an optimal resource based on the continuously monitored states of the network paths comprises determining, by the processor, which of the suitable resources is accessible by a most appropriate route.

9. The method in accordance with claim 8, wherein the most appropriate route is a least congested route compared to other routes to the suitable resources.

10. The method in accordance with claim 8, wherein the most appropriate route is a most congested route compared to other routes to the suitable resources.

11. A method of dynamically routing a contact received at a dynamic switch network of a contact center, the dynamic switch network comprising a plurality of dynamic switches interconnected by network paths and the contact center comprising a plurality of resources, the method comprising:
identifying, by a processor, which of the plurality of resources within the contact center are suitable for handling the contact, wherein the plurality of dynamic switches are connected to the resources, each resource being associated with a respective set of attributes;
continuously monitoring, by the processor in communication with a dynamic controller, states of the network paths between the plurality of dynamic switches,
wherein each dynamic switch comprises a respective data path separate from a respective control path; and
wherein the dynamic controller is connected to each of the dynamic switches via the respective control path of the dynamic switch to control operation of the dynamic switches;

designating, by the processor, one of the suitable resources as an optimal resource based on the continuously monitored states of the network paths and requirements of the contact;

determining, by the processor, which of a plurality of routes between the contact and the suitable resource is an optimal route through the dynamic switch network based on the associated respective sets of attributes of the resources and the continuously monitored states of the network paths; and transmitting, by the processor, routing instructions for the optimal route to the dynamic controller.

12. The method in accordance with claim 11, wherein the step of continuously monitoring the states of the network paths comprises receiving, by the processor, information related to the states of the network paths from the dynamic controller.

13. The method in accordance with claim 11, wherein the step of determining which of a plurality of routes between the contact and the one of the plurality of resources is an optimal route comprises correlating, by the processor, requirements of the contact with the continuously monitored states of the network paths.

14. The method in accordance with claim 11, wherein routing instructions for the optimal route comprises instructions for reconfiguring the dynamic switches to route the contact to the one of the plurality of resources via one or more of the network paths in accordance with the optimal route.

* * * * *